(12) United States Patent
Nishikawa et al.

(10) Patent No.: US 9,940,813 B2
(45) Date of Patent: Apr. 10, 2018

(54) ABNORMALITY REPORTING SYSTEM AND ELECTRIC TOOL, AND COMMUNICATION TERMINAL

(71) Applicant: HITACHI KOKI CO., LTD., Tokyo (JP)

(72) Inventors: Tomomasa Nishikawa, Ibaraki (JP); Takuya Konnai, Ibaraki (JP); Tatsuya Ito, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 0 days.

(21) Appl. No.: 15/116,360

(22) PCT Filed: Jan. 9, 2015

(86) PCT No.: PCT/JP2015/050505
§ 371 (c)(1),
(2) Date: Aug. 3, 2016

(87) PCT Pub. No.: WO2015/118900
PCT Pub. Date: Aug. 13, 2015

(65) Prior Publication Data
US 2016/0351039 A1    Dec. 1, 2016

(30) Foreign Application Priority Data
Feb. 4, 2014 (JP) ................. 2014-019445

(51) Int. Cl.
*G08B 21/18* (2006.01)
*B25F 5/00* (2006.01)

(52) U.S. Cl.
CPC ............... *G08B 21/18* (2013.01); *B25F 5/00* (2013.01); *G05B 2219/24011* (2013.01)

(58) Field of Classification Search
CPC .. G08B 21/18; B25F 5/00; G05B 2219/24011
See application file for complete search history.

(56) References Cited

U.S. PATENT DOCUMENTS

2006/0155582 A1   7/2006  Brown
2006/0179473 A1   8/2006  Innami et al.
(Continued)

FOREIGN PATENT DOCUMENTS

DE   10-2007-035095 A1   1/2009
JP         57-48089 U     3/1982
(Continued)

OTHER PUBLICATIONS

Office Action received in corresponding Japanese Patent Application No. 2015-561241 dated Sep. 6, 2016, with English language translation.
(Continued)

*Primary Examiner* — Leon Flores
(74) *Attorney, Agent, or Firm* — McDermott Will & Emery LLP

(57) ABSTRACT

A technique capable of immediately reporting to an operator an occurrence of abnormality in an electric tool is provided. A communication terminal 100 includes a communication-terminal-side control unit that determines whether abnormality has occurred in any of electric tools 10, 200, 300, and 400 based on information acquired from the electric tools 10, 200, 300, and 400 via wireless communication. When the communication-terminal-side control unit determines the occurrence of abnormality in any one of the electric tools 10, 200, 300, and 400, the occurrence of abnormality in the electric tool 10, 200, 300, or 400 is reported by at least one of a report unit included in the electric tools 10, 200, 300, and 400 other than the electric tool 10, 200, 300, or 400 in which the occurrence of abnormality is determined and a report unit included in the communication terminal 100.

18 Claims, 9 Drawing Sheets

(56) References Cited

U.S. PATENT DOCUMENTS

| | | | | |
|---|---|---|---|---|
| 2013/0109375 A1* | 5/2013 | Zeiler | .................. | H04W 4/028 |
| | | | | 455/426.1 |
| 2014/0240125 A1* | 8/2014 | Burch | ................ | G08B 21/0213 |
| | | | | 340/539.13 |

FOREIGN PATENT DOCUMENTS

| | | | |
|---|---|---|---|
| JP | 2004-094435 A | 3/2004 | |
| JP | 2004-300996 A | 10/2004 | |
| JP | 2005-150863 A | 6/2005 | |
| JP | 2006-218575 A | 8/2006 | |
| JP | 2011-067911 A | 4/2011 | |
| JP | 2011-104686 A | 6/2011 | |
| JP | 2013-041518 A | 2/2013 | |
| JP | 2013-091115 A | 5/2013 | |
| JP | 2013-257835 A | 12/2013 | |
| WO | 2013/063507 A1 | 5/2013 | |

OTHER PUBLICATIONS

Search Report received in corresponding International Application No. PCT/JP2015/050505 dated Mar. 3, 2015.
Extended Search Report issued in corresponding European Patent Application No. 15746701.0, dated Aug. 16, 2017.
Decision of Refusal issued in corresponding Japanese Patent Application No. 2015-561241 dated Apr. 12, 2017, with English language translation.

* cited by examiner

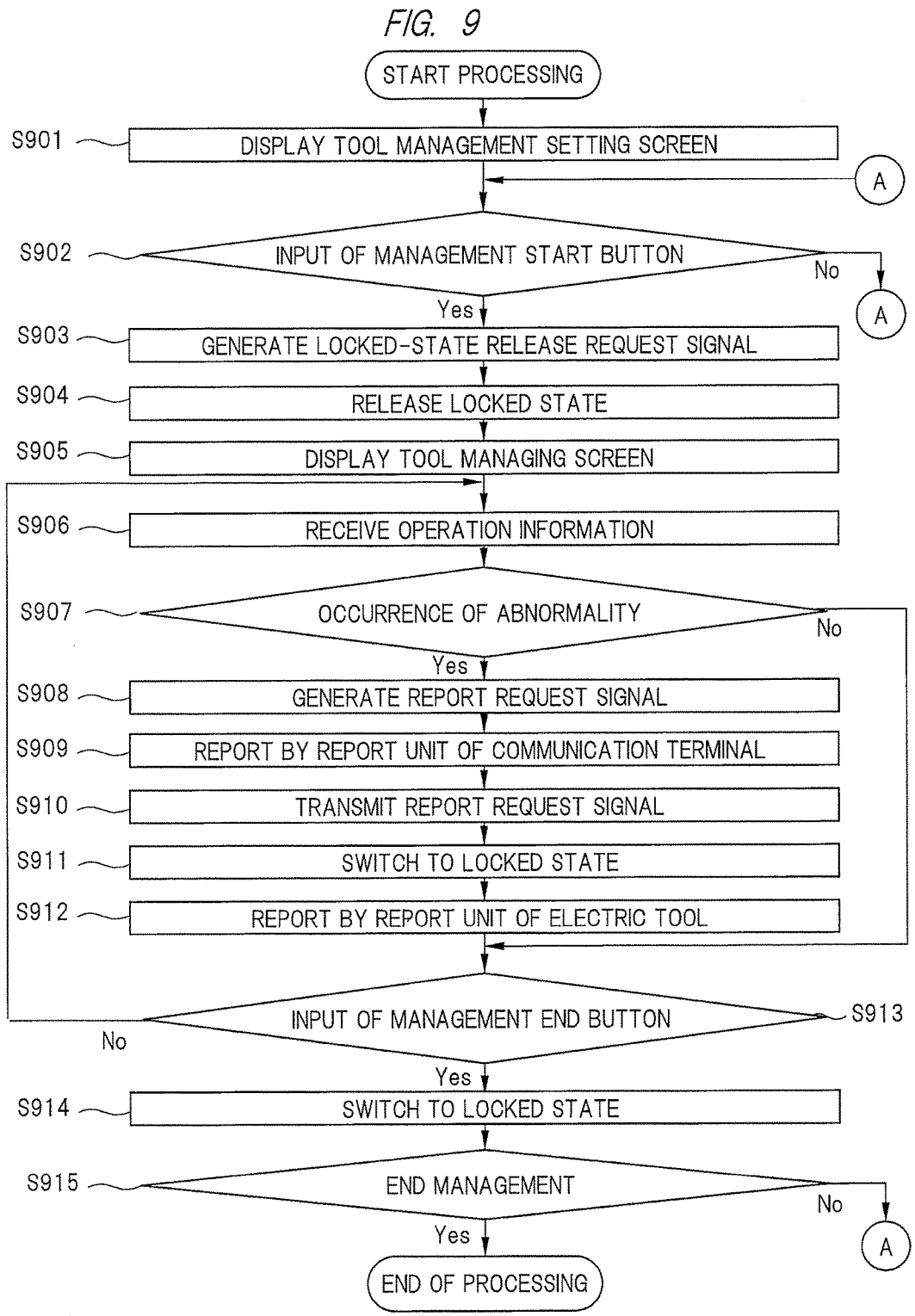

ABNORMALITY REPORTING SYSTEM AND ELECTRIC TOOL, AND COMMUNICATION TERMINAL

CROSS REFERENCE

This application is the U.S. National Phase under 35 US.C. § 371 of International Application No. PCT/JP2015/050505, filed on Jan. 9, 2015, which claims the benefit of Japanese Application No. 2014-019445, filed on Feb. 4, 2014, the entire contents of each are hereby incorporated by reference.

TECHNICAL FIELD

The present invention relates to an abnormality reporting system and an electric tool, and a communication terminal.

BACKGROUND ART

A portable air compressor (compressor) used in a power tool or the like is a known example of the electric tool. Also, an impact driver is also known as an example of the electric tool for use in fastening screws, bolts, and so on. Also, a portable cutter (circular saw) is known as an example of the electric tool for cutting a workpiece with disc-shaped blades by rotating the blades. Also, a desktop cutter (desktop circular saw) is known as an example of the electric tool for cutting a workpiece mounted on abase portion with disc-shaped blades by rotating the blades.

Such portable electric tools are brought into a construction site and the like and used, in relatively many cases. However, the electric tools may be left in the site during break time such as lunch, or after the work of the day, in some cases, resulting in a case in which the electric tool may be stolen. Accordingly, it is desired to improve the security of the electric tools.

Note that an air compressor including a compressed air generation unit driven by a motor is disclosed in, for example, Patent Document 1.

RELATED ART DOCUMENT

Patent Document

Patent Document 1: Japanese Patent Application Laid-Open Publication No. 2004-300996

SUMMARY OF THE INVENTION

Problems to be Solved by the Invention

In the past method, it has not been possible to immediately report to an operator when abnormality occurred in the electric tool or the occurrence of abnormality in the electric tool. It is an object of the present invention to provide a technique capable of immediately reporting the occurrence of abnormality in the electric tool to the operator.

Means for Solving the Problems

The typical ones of the inventions disclosed in the present application will be briefly described as follows.

An abnormality reporting system according to an embodiment of the present invention includes a plurality of electric tools, and a communication terminal connected to the electric tools via wireless communication. Also, the communication terminal includes a communication-terminal-side control unit that determines whether abnormality has occurred in any of the electric tools based on information acquired from the electric tools via the wireless communication. Also, when the communication-terminal-side control unit determines that abnormality has occurred in any of the electric tools, the occurrence of abnormality in the electric tool is reported by at least one of a report unit included in the electric tool other than the electric tool in which the occurrence of abnormality is determined and a report unit included in the communication terminal.

Also, in another embodiment, an electric tool includes a working unit, and an operation terminal unit connected to the working unit via wireless communication to transmit/receive a control signal to and from the working unit, in which the operation terminal unit is connected to the working unit and a working unit of an electric tool other than the working unit via the wireless communication, and the operation terminal unit determines whether abnormality has occurred in any of the electric tools based on information acquired from the working unit. Also, when the operation terminal unit determines the occurrence of abnormality in any of the electric tools, the operation terminal unit transmits a signal for reporting the occurrence of abnormality to the operation terminal unit, and the electric tool other than the electric tool in which the occurrence of abnormality is determined or the working unit.

Also, in another embodiment, a communication terminal connected to a plurality of electric tools via wireless communication includes a communication-terminal-side control unit that determines whether abnormality has occurred in any of the electric tools based on information acquired from the electric tools via the wireless communication. Also, when the communication-terminal-side control unit determines the occurrence of abnormality in any of the electric tools, the communication-terminal-side control unit generates a report request signal for reporting the occurrence of abnormality in the electric tool to at least one of a report unit included in the communication terminal and a report unit included in the electric tool other than the electric tool in which the occurrence of abnormality is determined.

Effects of the Invention

The effects obtained by typical ones of the inventions disclosed in the present application will be briefly described below.

According to a representative embodiment of the present invention, the occurrence of abnormality in the electric tool can be reported immediately to the operator.

BRIEF DESCRIPTIONS OF THE DRAWINGS

FIG. 9 illustrates an outline of overall processing according to the embodiment of the present invention.

DETAILED DESCRIPTION OF PREFERRED EMBODIMENTS

Figure 1:
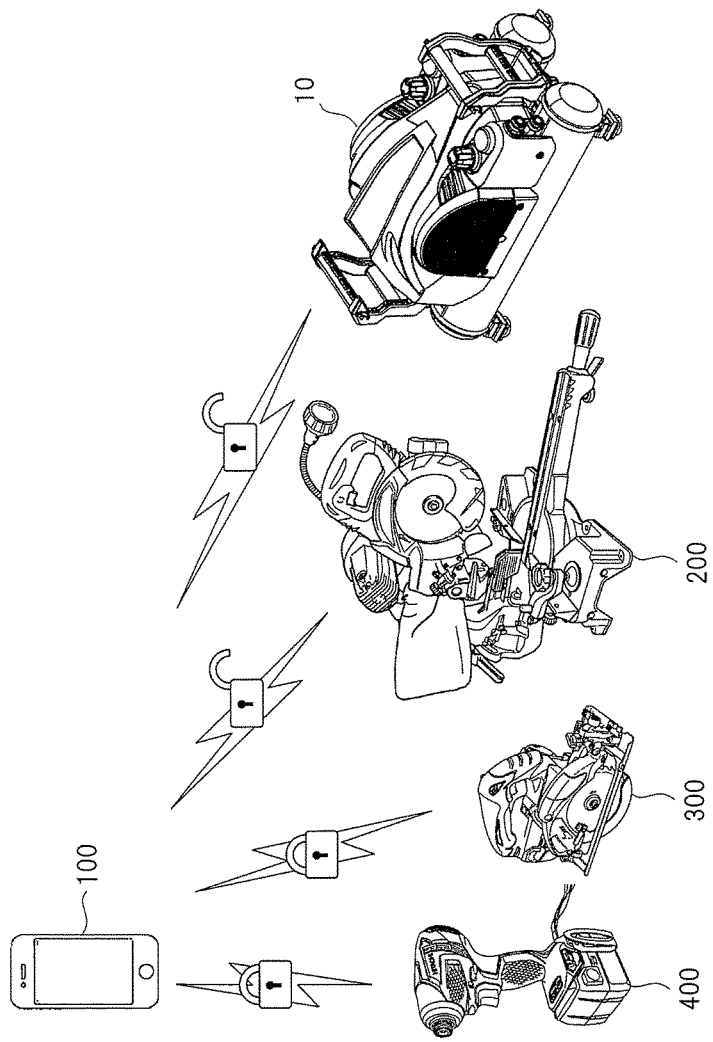
FIG. 1 illustrates an example of appearance of an abnormality reporting system according to an embodiment of the present invention.

Hereinafter, an embodiment of the present invention will be described in detail with reference to the accompanying drawings. Note that components having the same function are denoted by the same reference characters throughout the drawings for describing the embodiment, and the repetitive description thereof will be omitted.

An abnormality reporting system according to an embodiment of the present invention includes a communication terminal (e.g., a smart phone), and a plurality of electric tools (e.g., an air compressor, an impact driver, a circular saw, and a desktop circular saw). The communication terminal is connected to respective electric tools via wireless communication. Then, the communication terminal acquires operation information (which indicates whether the electric tools are in operation) from the respective electric tools and determines whether abnormality has occurred in any of the electric tools based on the acquired operation information. Then, when the communication terminal determines that abnormality has occurred in any of the electric tools, the occurrence of abnormality in the electric tool is reported by at least one of a report unit of the communication terminal itself and a report unit of the electric tool other than the electric tool in which abnormality has occurred. Thus, the occurrence of abnormality in the electric tool can be reported immediately to the operator.

<Overall Structure>

FIG. 1 illustrates an example of appearance of an abnormality reporting system according to an embodiment of the present invention. As illustrated in FIG. 1, the abnormality reporting system includes a plurality of electric tools (such as an air compressor 10 which is an example of the electric tool, a desktop circular saw 200, a circular saw 300, or an impact driver 400), and a communication terminal 100 connected to the respective electric tools via the wireless communication. A codeless electric tool that operates by receiving power from a built-in battery is also included in the examples of the electric tools. In addition, an electric tool that operates by receiving power from an AC power source is also included in the examples of the electric tools.

The communication terminal 100 includes, for example, an operation terminal (operation terminal unit) which is a terminal device in the shape of a remote controller dedicated for remotely operating the electric tools, and a portable universal information processing terminal device which has a function other than the function of remotely operating the electric tools (working units), such as a smart phone, a tablet-type terminal device, or a smart watch (including a bracelet type terminal device having a communication function).

Also, the communication terminal 100 and each of the electric tools are connected with each other via the wireless communication. Each of the electric tools is stopped and is in a locked state in which an operation toward each of the electric tools is locked, until the connection with the communication terminal 100 via the wireless communication is established.

Also, in the communication terminal 100, an abnormality reporting application that enables a report of the occurrence of abnormality in any of the electric tools is installed.

The respective electric tools are registered in the communication terminal 100 through predetermined authentication processing executed by entering a security key managed by the abnormality reporting application.

Then, the communication terminal 100 establishes the connection with all of the registered electric tools via the wireless communication and broadcasts a locked-state release request signal to release the locked state to all of the electric tools with which the connection via the wireless communication is established. Then, the locked states of the respective electric tools are collectively released after the establishment of the connection via the wireless communication. Accordingly, it is possible to save labor of individually releasing the locked states of various types of electric tools.

Figure 2:
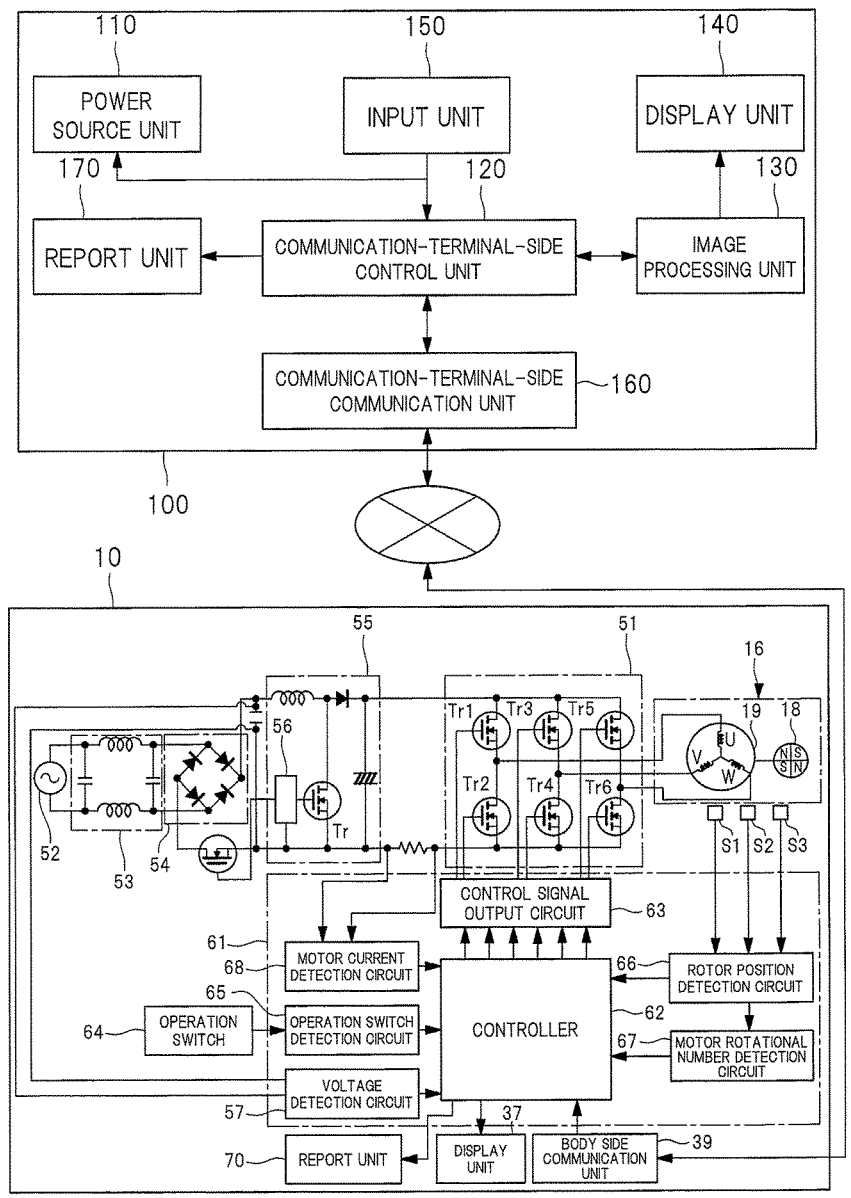
FIG. 2 illustrates a block diagram showing an example of an abnormality reporting system according to the embodiment of the present invention.

FIG. 2 illustrates a block diagram showing an example of the abnormality reporting system according to the embodiment of the present invention. As illustrated in FIG. 2, the abnormality reporting system includes, for example, an air compressor 10 which is an example of the electric tool, and the communication terminal 100. Also, the air compressor 10 which is an example of the electric tool includes a motor 16, a display unit 37, a body side communication unit 39, a controller 62, an operation switch 64, a report unit 70, and the like. Also, the communication terminal 100 includes a power source unit 110, a communication-terminal-side control unit 120, an image processing unit 130, a display unit 140, an input unit 150, a communication-terminal-side communication unit 160, and a report unit 170.

Also, the communication terminal 100 is implemented by predetermined hardware and software. For example, the communication terminal 100 includes a processor, a memory, and the like, and a program on the memory executed by the processor allows the communication terminal 100 to function.

The input unit 150 of the communication terminal 100 accepts operation from the operator. The input unit 150 includes a touch panel, buttons, and switches. The input unit 150 inputs an instruction signal corresponding to an input signal accepted by the operation or use by the operator to the communication-terminal-side control unit 120.

Figure 3:
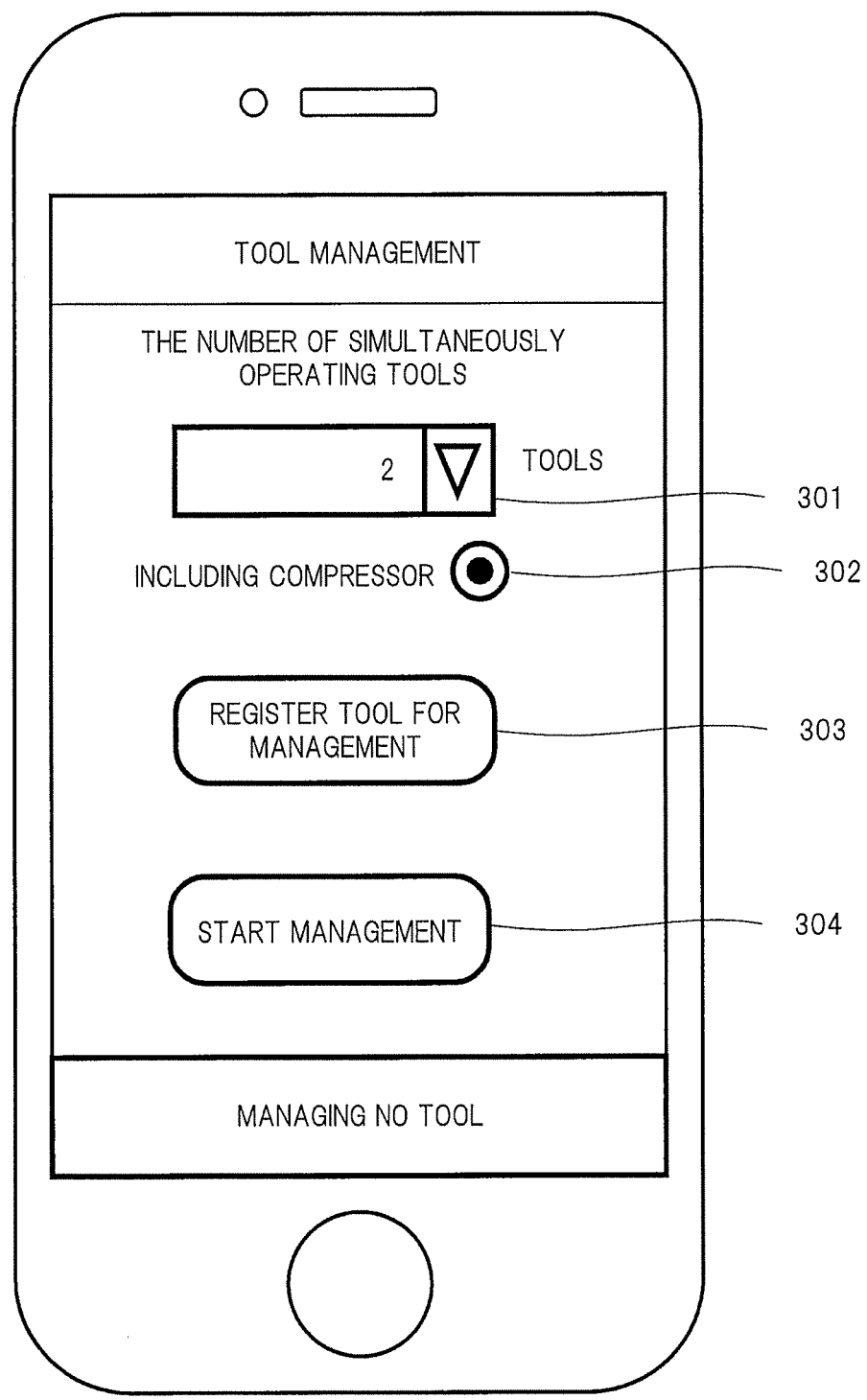
FIG. 3 illustrates an example of a tool management setting screen displayed on a display unit of a communication terminal according to the embodiment of the present invention.

Upon activation of the abnormality reporting application installed in the communication terminal 100, the communication terminal 100 displays a tool management setting screen (which is described later and in FIG. 3) on the display unit 140. Hereinafter, the tool management setting screen will be described with reference to FIG. 3. The tool management setting screen displays an input button 301 for inputting the number of simultaneously operating tools, a compressor selection button 302, a tool management setting button 303, and a management start button 304.

When the tool management setting button 303 accepts an input, the processing of newly registering the electric tool managed by the abnormality reporting application is performed through the authentication processing. The authentication processing is performed by, for example, determining whether a correct security key is input to the communication terminal 100 after the connection via the wireless communication is established between the electric tool to be newly registered and the communication terminal 100. Then, the name of the authenticated electric tool is associated with identification information of the electric tool (e.g., a BD (Bluetooth (registered trademark) Device) address, or an MAC (Media Access Control) address) to be registered in a storage unit (not illustrated) of the communication terminal 100.

After the input button 301 for inputting the number of simultaneously operating tools accepts the input, the input unit 150 accepts the input of the number representing the number of electric tools scheduled to operate simultaneously. Also, although not illustrated, the input unit 150 accepts the input of identification information (or names) of the respective electric tools corresponding to the number of electric tools scheduled to operate simultaneously.

The compressor selection button 302 accepts the input for selecting whether the air compressor 10 (compressor) is included in the electric tools to be operated. Specifically, each time the compressor selection button 302 accepts the input, the state is switched between a state in which the air compressor 10 (compressor) is included in the electric tools scheduled to operate and a state in which the air compressor 10 (compressor) is not included.

Figure 4:
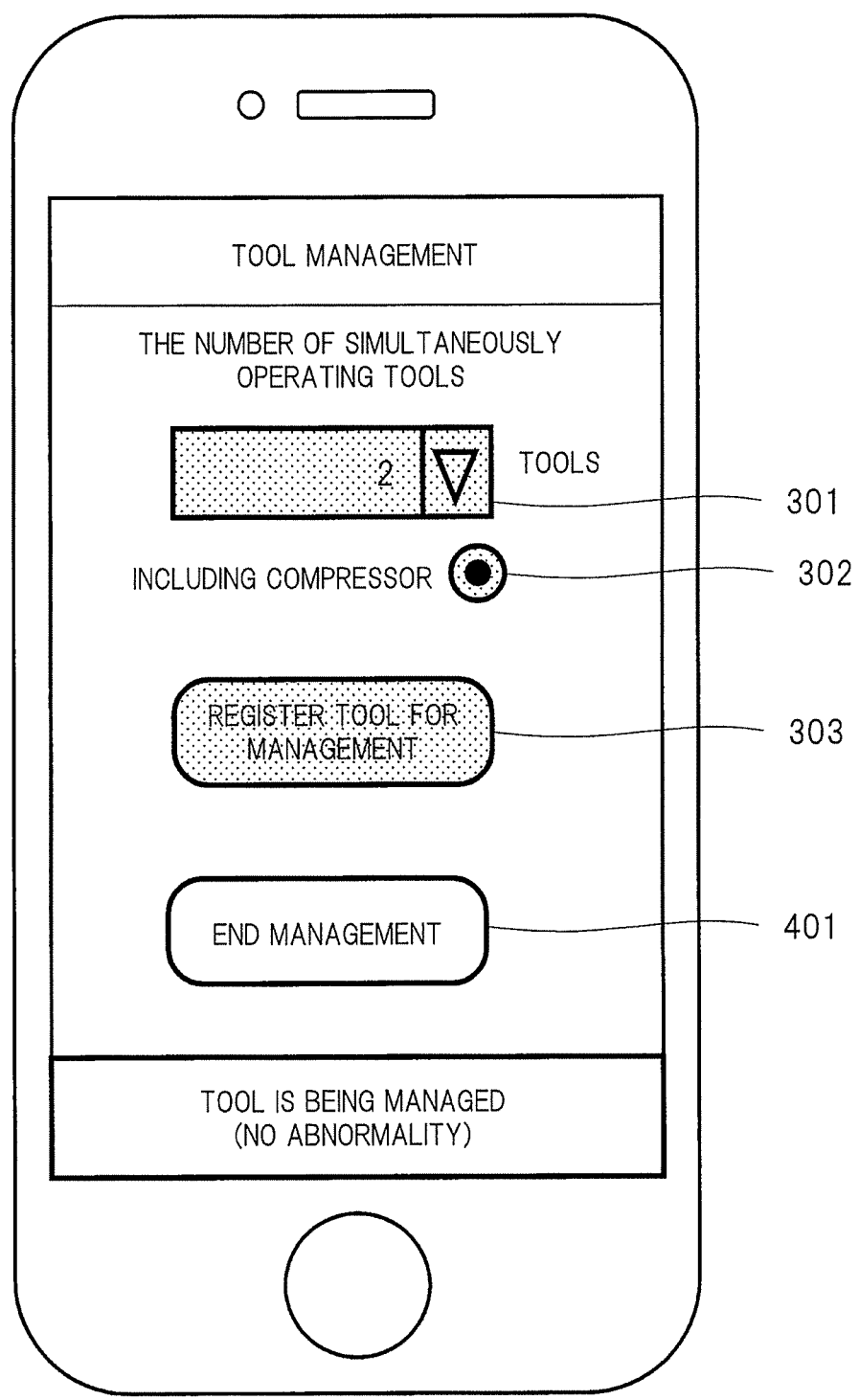
FIG. 4 illustrates an example of a tool managing screen displayed on a display unit of the communication terminal according to the embodiment of the present invention.

When the management start button 304 accepts the input, the management of the respective electric tools is started by the abnormal reporting application, and the display is switched to a tool managing screen (described later and in FIG. 4).

Hereinafter, the tool managing screen will be described with reference to FIG. 4. The tool managing screen displays the input button 301 for inputting the number of simultaneously operating tools, the compressor selection button 302, the tool management setting button 303, and a management end button 401.

Here, the tool managing screen represents that the respective electric tools are being managed. Accordingly, it is not preferable to change the electric tools to be managed. Therefore, the tool managing screen displays the input button 301 for inputting the number of simultaneously operating tools, the compressor selection button 302, and the tool management setting button 303 in a different manner from those on the tool management setting screen, such that even though the input is selected and accepted by these buttons, such input is ignored.

When the management end button 401 accepts the input, management of the respective electric tools by the abnormality reporting application is ended, and the screen is then switched to the tool management setting screen (described above and in FIG. 3).

FIG. 2 will be referred to again. Upon activation of the abnormality reporting application, the communication-terminal-side control unit 120 of the communication terminal 100 acquires all pieces of identification information of the registered electric tools and inputs the acquired identification information to the communication-terminal-side communication unit 160. Then, the communication-terminal-side communication unit 160 establishes the connection via the wireless communication between the input identification information and corresponding electric tools.

Also, when the management start button 304 described above accepts the input, the communication-terminal-side control unit 120 generates the locked-state release request signal for releasing the locked state. Subsequently, the generated locked-state release request signal is broadcasted by the communication-terminal-side control unit 120 to all of the electric tools with which the connection via the wireless communication is established.

The body side communication unit 39 of each electric tool receives the broadcasted locked-state release request signal. Then, the body side communication unit 39 of each electric tool inputs the received locked-state release request signal to the controller 62. The controller 62 which receives the locked-state release request signal drives the motor 16 of the electric tool and releases the operation lock of the operation switch 64 of the electric tool to release the locked state. That is, the communication terminal 100 broadcasts the locked-state release request signal, so that the locked states of the respective electric tools are collectively released.

After the abnormality reporting application has started the management of the respective electric tools, the communication-terminal-side communication unit 160 receives operation information (indicating that each electric tool is in operation) from the respective electric tools. Then, the operation information received by the communication-terminal-side communication unit 160 is input to the communication-terminal-side control unit 120. Thus, the operation status of each electric tool can be recognized by the abnormality reporting application. Also, the operation information is transmitted from the body side communication unit 39 to the communication terminal 100 each time a trigger (e.g., a trigger of the impact driver 400) for operating the electric tool is pulled (or while the trigger is being pulled).

The communication-terminal-side control unit 120 of the communication terminal 100 determines whether abnormality has occurred in any of the electric tools with which the connection via the wireless communication is established.

Note that, when the communication-terminal-side control unit 120 does not receive the operation information from the electric tool scheduled to operate, the communication-terminal-side control unit 120 determines that abnormality has occurred in this electric tool. For example, since the wireless communication cannot be established when the electric tool is brought out of the range in which the electric tools can establish the wireless communication with the communication terminal 100 or since the wireless communication is disconnected when the electric power supplied to the electric tool is cut off, the communication-terminal-side communication unit 160 cannot receive the operation information from the electric tool. In this case, the controller 62 of the electric tool determines by itself that the wireless communication cannot be established and switches the electric tool to the locked state.

Also, when the electric tools exceeding the number of the electric tools scheduled to operate and of which the input has been accepted on the tool management setting screen (described above and in FIG. 3) are in operation, the communication-terminal-side control unit 120 determines that abnormality has occurred in the electric tool from which the operation information is received, even though the electric tool is not scheduled to operate. Specifically, the communication-terminal-side control unit 120 determines that abnormality has occurred when the operation information is received from the electric tool other than the electric tool that corresponds to the identification information (identification information of the electric tools scheduled to operate simultaneously) of which the input has been accepted on the tool management setting screen (described above and in FIG. 3). In this case, the communication-terminal-side control unit 120 generates a locked-state switch request signal for requesting switching to the locked state and broadcasts the generated locked-state switch request signal to all the electric tools having established communication via the communication-terminal-side communication unit 160. The controller 62 of each electric tool having received the locked-state switch request signal switches the electric tool to the locked state. Note that the communication-terminal-side control unit 120 may allow the communication-terminal-side communication unit 160 to transmit the locked-state switch request signal to the electric tools that are not scheduled to operate simultaneously.

Meanwhile, when the communication-terminal-side control unit 120 receives the operation information successively within a predetermined time period from the same electric tool (or simultaneously) a predetermined number of times or more (caused by pulling the trigger of the electric tool successively within a predetermined time period (or simultaneously)), the communication-terminal-side control unit 120 determines the occurrence of abnormality in the electric tool that receives the operation information successively a predetermined number of times or more (because an abnormal operation that is not executed by the ordinary operator is being executed). In this case, the communication-terminal-side control unit 120 transmits the generated locked-state switch request signal to the electric tool in which the occurrence of abnormality is determined via the communication-terminal-side communication unit 160. The controller 62 of the electric tool that receives the locked-state switch request signal switches the electric tool to the locked state.

Also, when the motor 16 of the electric tool has continuously been driven for a predetermined time period or more, the communication-terminal-side control unit 120 determines the occurrence of abnormality in the electric tool of which the motor 16 has continuously been driven for a predetermined time period or more. In this case, the communication-terminal-side control unit 120 transmits the generated locked-state switch request signal to the electric tool in which the occurrence of abnormality is determined via the communication-terminal-side communication unit 160. The controller 62 of the electric tool that receives the locked-state switch request signal switches the electric tool to the locked state.

When the communication-terminal-side control unit 120 determines that abnormality has occurred in any of the electric tools, the communication-terminal-side control unit 120 generates a report request signal and inputs the generated report request signal to the report unit 170 of the communication terminal 100. Then, the report unit 170 of the communication terminal 100 to which the report request signal has been input from the communication-terminal-side control unit 120 reports the occurrence of abnormality in the electric tool. Also, the communication-terminal-side control unit 120 allows the display unit 140 to display the name of the electric tool in which abnormality has occurred.

Further, the communication-terminal-side control unit 120 inputs the generated report request signal to the communication-terminal-side communication unit 160. The communication-terminal-side communication unit 160 broadcasts the input report request signal to all of the electric tools with which the communication is established.

The body side communication unit 39 of the electric tool which has received the transmitted report request signal inputs the received report request signal to the controller 62. The controller 62 which receives the report request signal switches the electric tool to the locked state. Further, the controller 62 allows the report unit 70 of the electric tool to report the occurrence of abnormality in the electric tool. Note that the report unit 70 of the electric tool is an LED lamp, and blinking the LED lamp reports the occurrence of abnormality in the electric tool.

When the management end button 401 of the tool managing screen (described above and in FIG. 4) accepts the input, the abnormality reporting application ends the management and switches the display from the tool managing screen (described above and in FIG. 4) to the tool management setting screen (described above and in FIG. 3). Also, the communication-terminal-side control unit 120 generates the locked-state switch request signal. Then, the communication-terminal-side control unit 120 allows the communication-terminal-side communication unit 160 to broadcast the locked-state switch request signal to all of the electric tools with which the connection via the wireless communication is established.

The body side communication unit 39 of each electric tool receives the broadcasted locked-state switch request signal. Then, the body side communication unit 39 inputs the received locked-state switch request signal to the controller 62. The controller 62 of each electric tool which receives the locked-state switch request signal stops the motor 16 of the electric tool and switches to the locked state by locking the operation of the operation switch 64 of the electric tool. That is, the communication terminal 100 broadcasts the locked-state switch request signal, so that the respective electric tools are collectively switched to the locked state.

The air compressor 10 includes an inverter circuit 51 for controlling a driving current toward U-phase, V-phase, and W-phase windings. The inverter circuit 51 receives electric power through a rectifier circuit 54 for rectifying an alternate current from a commercial power source 52 to a direct current, and a power factor correction circuit (PFC) 55 for by stepping up the rectified direct current voltage to supply to the inverter circuit 51. The power factor correction circuit 55 includes an IC 56 that outputs a PWM control signal to a transistor Tr formed by a MOSFET to suppress a harmonic current generated in the switching element of the inverter circuit 51 to a limit value or less. Note that, to prevent transmission of noise generated in the inverter circuit 51 and the like to the commercial power source, a noise countermeasure circuit 53 is provided between the commercial power source 52 and the rectifier circuit 54.

The inverter circuit 51 of the air compressor 10 is a three-phase full bridge inverter circuit and includes two switching elements Tr1 and Tr2, two switching elements Tr3 and Tr4, and two switching elements Tr5 and Tr6 which are serially connected to each other, and the respective switching elements are connected to positive and negative output terminals of the power factor correction circuit 55. The three switching elements Tr1, Tr3, and Tr5 connected to the positive side are high side elements, and the three switching elements Tr2, Tr4, and Tr6 connected to the negative side are low side elements. One of the connecting terminals of the U-phase winding is connected between the two switching elements Tr1 and Tr2. One of the connecting terminals of the V-phase winding is connected between the two switching elements Tr3 and Tr4. One of the connecting terminals of the W-phase winding is connected between the two switching elements Tr5 and Tr6. The other connecting terminals of the U-phase, V-phase, and W-phase windings are interconnected, and each winding is in a star connection. Note that the connection may be in a delta connection. The switching elements Tr1 to Tr6 are each formed by MOSFETs.

For example, an electric current is supplied to the U-phase and V-phase wirings when a control signal is supplied to a gate of the high-side switching element Tr1 and a gate of the low-side switching element Tr4. Timing of the control signal supplied to each switching element is adjusted to control commutating operation to each winding.

A motor control unit 61 that calculates the control signal to output the control signal to the inverter circuit 51 of the air compressor 10 includes the controller 62. The controller 62 is provided on the body side control unit 32 which is a control board illustrated in FIG. 6, which will be described later. The controller 62 transmits a control signal to the inverter circuit 51 via a control signal output circuit 63. The display unit 37 receives the operation by the operator to send a signal indicating on and off of the motor and a rotational number of the motor to the controller 62 via an operation switch detection circuit 65. A detection signal from hall elements S1 to S3 functioning as rotational position detection sensors is transmitted to a rotor position detection circuit 66. The rotor position detection circuit 66 transmits a signal to a motor rotational number detection circuit 67 which, in turn, outputs a signal corresponding to the motor rotational number to the controller 62. A motor current detection circuit 68 for detecting an electric current flowing in the motor 16 transmits a detection signal corresponding to the motor current to the controller 62.

The controller 62 includes a microprocessor that calculates the control signal, and a memory that stores a control program, calculation expressions, data, and the like, and the controller 62 is constituted by an energization phase switching control unit for controlling energization timing for the windings and an advance angle control unit for advancing the energization timing based on the detection signals of the hall elements S1 to S3.

The rotational number of the motor is controlled by adjusting an effective voltage supplied to each of the windings. The effective voltage control for the windings is executed by, for example, executing PWM control of the switching elements to adjust the duty ratio of the on-signal applied to each gate of the switching elements Tr1 to Tr6 of the inverter circuit 51. For example, when the duty ratio is set to 10%, 10% of the output voltage from the power factor correction circuit 55 is supplied to each of the windings. When the duty ratio is set to 100%, the rotational number of the motor becomes the largest. Thus, the controller 62 of the air compressor 10 constitutes the voltage control unit.

<Detailed Structure>

Figure 5:
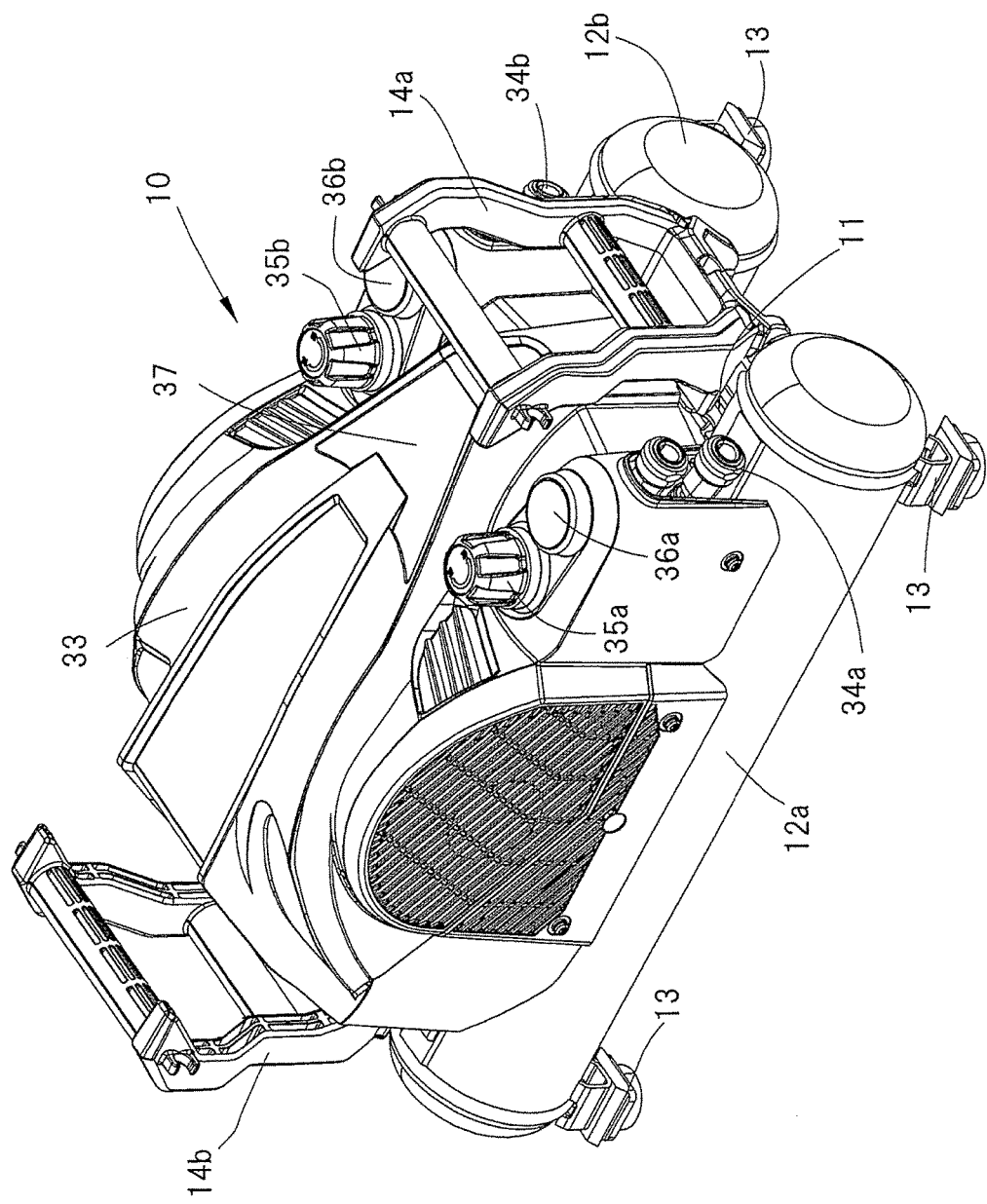
FIG. 5 is a perspective view illustrating an example of appearance of an air compressor provided as an example of an electric tool according to the embodiment of the present invention.
Figure 6:
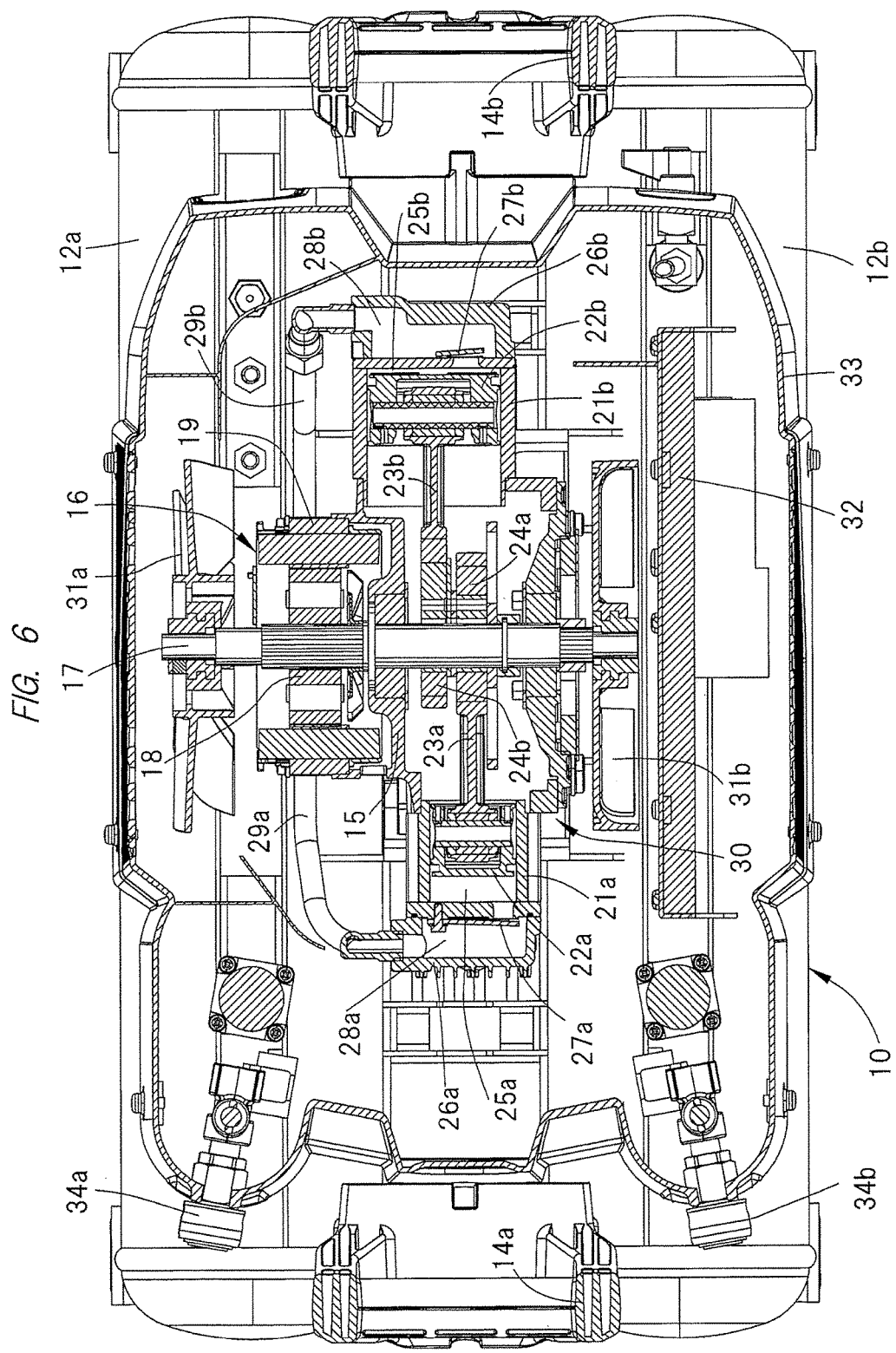
FIG. 6 is a cross-sectional view illustrating an example of a planar structure of the air compressor of FIG. 5.
Figure 7:
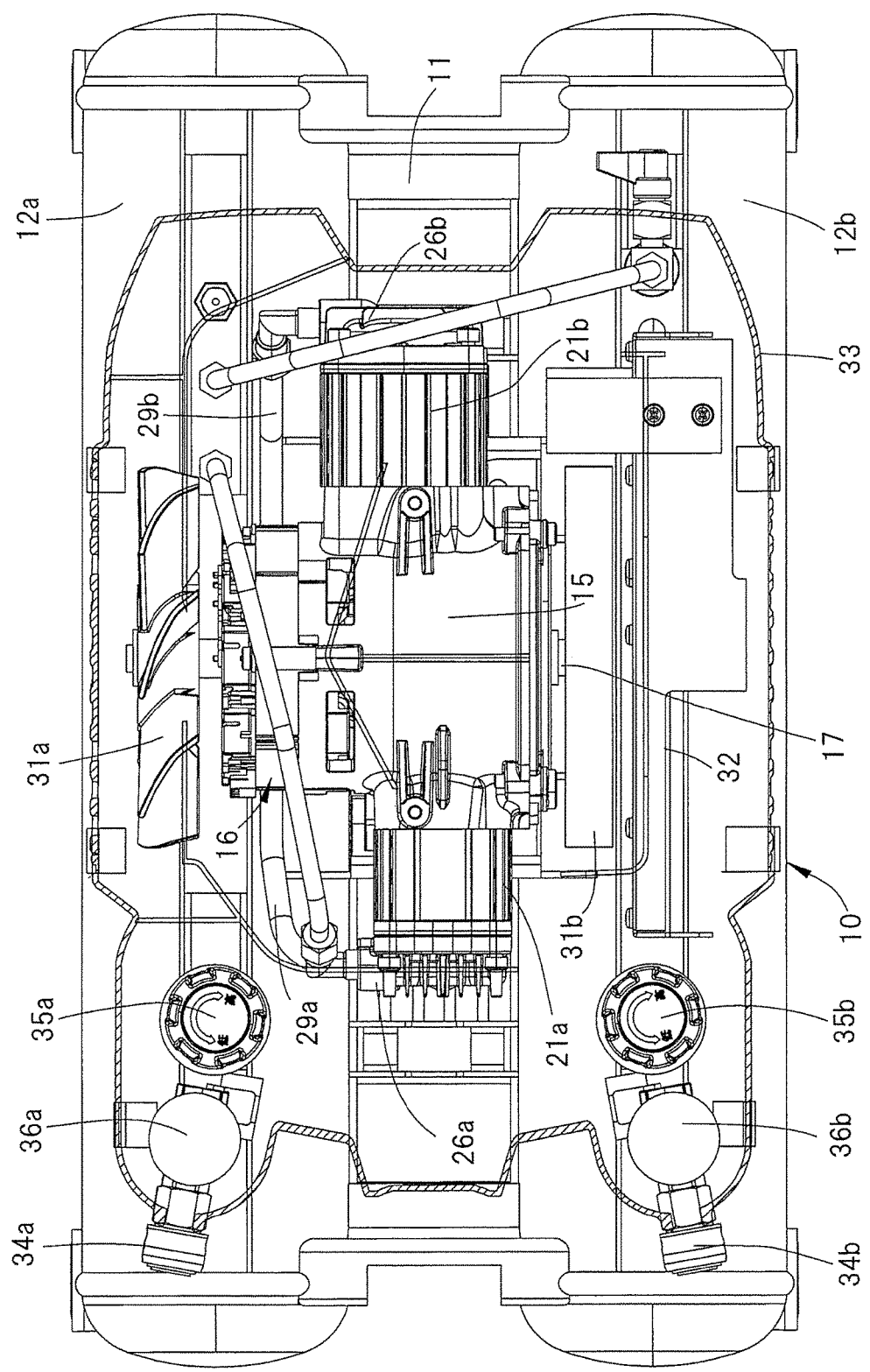
FIG. 7 is a plan view illustrating the air compressor of FIG. 5 in a partly broken manner.

The air compressor 10 illustrated in FIGS. 5 to 7 as an example of the electric tool of a first embodiment is a compressor operated by driving the motor, and the structure of the compressor 10 is described such that the compressor 10 includes two air tanks 12a and 12b installed on a base 11 in parallel with each other and legs 13 are attached to the lower surfaces of both ends of the air tanks 12a and 12b.

Also, the air compressor 10 is disposed at a predetermined installation position on portions of the legs 13, and handles 14a and 14b are provided on both ends of the base 11, such that the operator can hold the handles 14a and 14b to carry the air compressor 10. That is, the air compressor 10 is a portable compressor.

As illustrated in FIG. 6, a drive box 15 is installed on the base 11, and the motor 16 is attached to the drive box 15. The motor 16 includes a rotor 18 and a cylindrical stator 19 and is driven by receiving the electric power from the power source. The motor 16 used in the air compressor 10 of the first embodiment is, for example, a three-phase AC brushless motor.

A motor rotational shaft 17 is installed on the rotor 18 to drive a compressed air generation unit 30 as a driven member via the motor rotational shaft 17. The compressed air generation unit 30 generates compressed air by driving the motor 16.

Also, a plurality of field windings or windings are provided on the stator 19 opposite to the rotor 18. The rotor 18 is incorporated in the stator 19, such that the motor 16 is an inner-rotor-type motor. The stator 19 is attached to the drive box 15 as a housing for storing the motor 16.

The motor rotational shaft 17 is rotatably supported on the drive box 15. Two cylinders 21a and 21b are installed on the drive box 15 to be shifted by 180 degrees from each other in the rotational direction of the motor rotational shaft 17, and the pistons 22a and 22b are incorporated in the cylinders 21a and 21b, respectively, in a reciprocating manner in the shaft direction.

The pistons 22a and 22b are pin-connected with one ends of connecting rods 23a and 23b, respectively, in order to convert the rotational movement of the motor rotational shaft 17 into reciprocating movement in the axial direction of the pistons 22a and 22b. Eccentric cams 24a and 24b mounted on the motor rotational shaft 17 are provided at the other ends of the connecting rods 23a and 23b and are eccentrically arranged in a direction opposite to the reciprocating direction of the pistons 22a and 22b, respectively.

Accordingly, when the piston 22a which is one of the pistons is driven in a direction to compress drive chambers 25a and 25b, the other piston 22b is driven in a direction to expand the drive chambers 25a and 25b.

The cylinders 21a and 21b are provided with cylinder heads 26a and 26b, respectively, and the cylinder heads 26a and 26b are provided with check valves 27a and 27b, respectively. When the pistons 22a and 22b are driven in a direction to compress the drive chambers 25a and 25b, respectively, compressed air is supplied to the air tanks 12a and 12b through pipes 29a and 29b from discharge chambers 28a and 28b.

The piston 22b is a first-stage low pressure piston to introduce and compress the outside air, and the compressed air compressed by the low pressure piston 22b is further compressed by a second-stage high pressure piston 22a. The cylinders 21a and 21b, the pistons 22a and 22b, and the like which are described above constitute the compressed air generation unit 30, and the rotor 18 of the motor 16 is connected to the compressed air generation unit 30 via the rotational shaft 17. When the motor 16 drives the compressed air generation unit 30, the compressed air discharged from the high pressure piston 22a is accumulated in the air tanks 12a and 12b.

Specifically, the compressed air generation unit 30 generates the compressed air by the reciprocating movement of the pistons 22a and 22b due to rotation of the motor 16 and accumulates the compressed air generated in the compressed air generation unit 30 in the air tanks (tanks) 12a and 12b.

A cooling fan 31a is attached to one end of the motor rotational shaft 17 at a position outside of the motor 16, while a cooling fan 31b is attached to the other end of the motor rotational shaft 17. The body side control unit (control member or main board) 32 which is a control board is disposed outside the cooling fan 31b.

Also, cooling wind generated by the cooling fan 31a is blown to the motor 16, while cooling wind generated by the cooling fan 31b is blown to the controller. A cover 33 is provided on the base 11, such that the compressed air generation unit 30, the motor 16, the air tanks 12a and 12b, and the like, which are described above, are covered by the cover 33, as illustrated in FIGS. 6 to 8.

Couplers 34a and 34b are provided above the end portions of the air tanks 12a and 12b, respectively, as illustrated in FIG. 5, to supply the compressed air accumulated in the air tanks 12a and 12b to the outside. Pressure reducing valves 35a and 35b are provided in the air tanks 12a and 12b, respectively, to adjust the pressure of the compressed air to be discharged to the outside from the respective couplers 34a and 34b, and the reduced pressure of the air is indicated on a pressure gauges 36a and 36b and the display unit 37.

The body side control unit (control member or main board) 32 mainly controls the driving of the motor 16 or the air compression operation in the compressed air generation unit 30. Such control is executed by the controller 62, which is described above and illustrated in FIG. 2, functioning as a controlling microcomputer chip provided in the controller 62.

Figure 8:
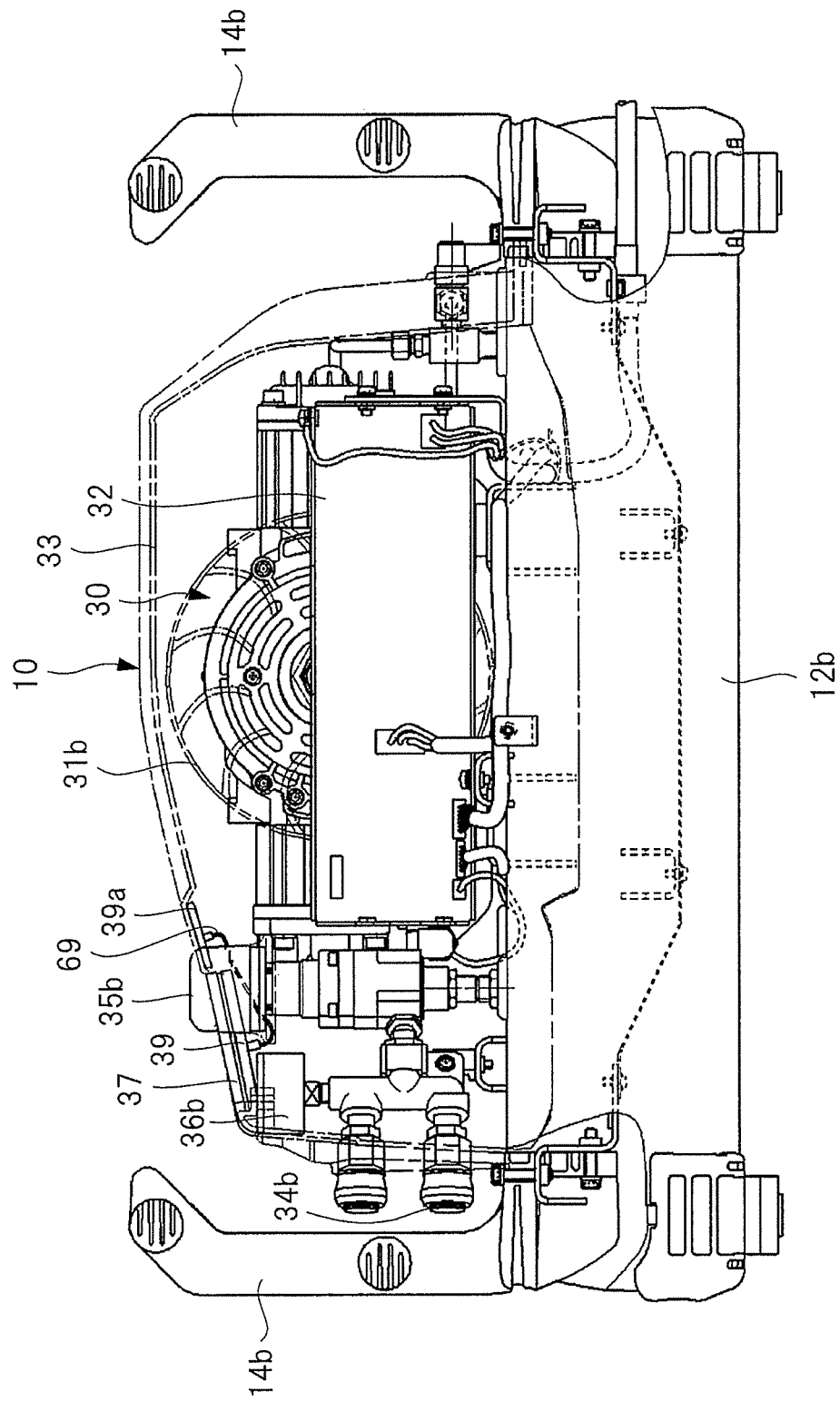
FIG. 8 is a side view illustrating an example structure of the air compressor of FIG. 5 when a cover is removed.

FIG. 8 is a side view illustrating an example structure of the air compressor 10 when a cover is removed. As illustrated in FIG. 8, the body side communication unit 39 includes a transmission/reception unit 39a that transmits/receives wireless signals, and the body side communication unit 39 is electrically connected to the transmission/reception unit 39a via a connection cable 69. The transmission/reception unit 39a is installed so as to be exposed from the cover 33. Note that the transmission/reception unit 39a may be mounted on the body side communication unit 39. Alternatively, the transmission/reception unit 39a may be provided inside the handles 14a and 14b. Moreover, the transmission/reception unit 39a may be attached to be exposed from the handles 14a and 14b. Further, the body side communication unit 39 may be provided on the controller. Furthermore, the body side communication unit 39 may be disposed at a position less susceptible to noise. Specifically, the body side communication unit 39 may be disposed at a position away from a range between the commercial power source 52 and the rectifier circuit 54 illustrated in FIG. 2. Also, the body side communication unit 39 may be disposed at a position away from the power factor correction circuit (PFC) 55, the inverter circuit 51, and the motor 16, which are described above and illustrated in FIG. 2.

Note that the controller 62 is disposed at an innermost position inside the cover 33 (inside the air compressor body), while the display unit 37 and the body side communication unit 39 are installed on the cover 33 of the air compressor body. Also, the display unit 37 has the display surface arranged so as to be exposed from the cover 33. Also, the body side communication unit 39 is disposed under the display unit 37, such that the body side communication unit 39 and the display unit 37 are stacked.

Thus, the transmission/reception unit 39a, the display unit 37, and the body side communication unit 39 of the air compressor 10 are provided in the vicinity of the cover 33. In this regard, the body side communication unit 39 and the display unit 37 may be arranged, for example, side by side.

<Overall Processing>

FIG. 9 illustrates an outline of overall processing according to the embodiment of the present invention. Note that the overall processing starts when the abnormality reporting application installed in the communication terminal 100 is activated. In the following description, it is assumed that all of the electric tools that have established the connection with the communication terminal 100 via the wireless communication are turned on.

First, in S901, the display unit 140 of the communication terminal 100 displays the tool management setting screen (described above and in FIG. 3). Then, the communication-terminal-side control unit 120 of the communication terminal 100 acquires all pieces of identification information of the registered electric tools and inputs each piece of the acquired identification information to the communication-terminal-side communication unit 160. Then, the communication-terminal-side communication unit 160 establishes the connection via the wireless communication with each of the electric tools corresponding to each piece of the input identification information.

Next, in S902, the communication-terminal-side control unit 120 determines whether the input has been accepted by the management start button 304 on the tool management setting screen. If the communication-terminal-side control unit 120 determines that the input has not been accepted by the management start button 304 in S902 (No at S902), the process returns to S902. Meanwhile, if the communication-terminal-side control unit 120 determines that the input has been accepted by the management start button 304 in S902 (Yes at S902), the process proceeds to S903.

Next, in S903, the communication-terminal-side control unit 120 generates the locked-state release request signal to release the locked state. Then, the generated locked-state release request signal is broadcasted by the communication-terminal-side control unit 120 to all of the electric tools with which the connection via the wireless communication is established in S902. Note that the locked-state release request signal may be unicasted by the communication-terminal-side control unit 120 to each of the electric tools with which the connection via the wireless communication is established.

Next, in S904, the body side communication unit 39 receives the locked-state release request signal transmitted in S903. Then, the body side communication unit 39 inputs the received locked-state release request signal to the controller 62. Having received the locked-state release request signal, the controller 62 stops the motor 16 of the electric tool and locks the operation of the operation switch 64 of the electric tool to release the locked state. Note that, instead of releasing the locked state after the reception of the locked-state release request signal, the controller 62 may release the locked state when the trigger for driving the motor 16 of the electric tool is pulled after the connection via the wireless communication is established in S902.

Next, in S905, the abnormality reporting application starts the management of the electric tools, and the display is switched from the tool management setting screen (described above and in FIG. 3) to the tool managing screen (described above and in FIG. 4).

Next, in S906, the communication-terminal-side communication unit 160 receives the operation information from each of the electric tools (the operation information indicates that the electric tools are in operation). Then, the operation information received by the communication-terminal-side communication unit 160 is input to the communication-terminal-side control unit 120. Accordingly, the abnormality reporting application can recognize the operation status of each electric tool.

Next, in S907, the communication-terminal-side control unit 120 of the communication terminal 100 determines whether abnormality has occurred in any of the electric tools that have established connection via the wireless communication in S902. In S907, if the communication-terminal-side control unit 120 determines that abnormality has not occurred in any of the electric tools (No in S907), the process proceeds to S913. Meanwhile, in S907, if the communication-terminal-side control unit 120 determines that abnormality has occurred in any of the electric tool (Yes in S907), the process proceeds to S908.

Next, in S908, the communication-terminal-side control unit 120 generates the report request signal and inputs the generated report request signal to the report unit 170. Also, the communication-terminal-side control unit 120 inputs the generated report request signal to the communication-terminal-side communication unit 160.

Next, in S909, the communication-terminal-side control unit 120 causes the report unit 170 of the communication terminal 100 to report the occurrence of abnormality in the electric tool. Also, the communication-terminal-side control unit 120 causes the display unit 140 to display the name of the electric tool in which abnormality has occurred.

Next, in S910, the communication-terminal-side communication unit 160 broadcasts the input report request signal to all of the electric tools with which the communication is established. Note that the communication-terminal-side communication unit 160 may transmit the report request signal to all of the electric tools with which the communication is established and other than the electric tool in which the occurrence of abnormality is determined in S907. Also, the communication-terminal-side communication unit 160 may transmit the report request signal to all of the electric tools scheduled to operate and other than the electric tool in which the occurrence of abnormality is determined in S907.

Next, in S911, the body side communication unit 39 of the electric tool having received the report request signal transmitted in S910 inputs the received report request signal to the controller 62. The controller 62 having received the report request signal switches the electric tools to the locked state. Note that, if the report request signal is transmitted in S910 to all of the electric tools with which the communication is established and other than the electric tool in which the occurrence of abnormality is determined, the controller 62 switches all of the electric tools with which the communication is established and other than the electric tools in which the occurrence of abnormality is determined to the locked state. Also, if the report request signal is transmitted in S910 to all of the electric tools scheduled to operate and other than the electric tool in which the occurrence of abnormality is determined, the controller 62 switches all of the electric tools scheduled to operate and other than the electric tool in which the occurrence of abnormality is determined to the locked state.

Next, in S912, the controller 62 causes the report unit 70 of the electric tool to report the occurrence of abnormality in the electric tool.

Next, in S913, the communication-terminal-side control unit 120 determines whether the management end button 401 of the tool managing screen (described above and in FIG. 4) has accepted the input. If the communication-terminal-side control unit 120 determines that the management end button 401 has not accepted the input in S913 (No at S913), the process returns to S906 to repeat the process. Meanwhile, if the communication-terminal-side control unit 120 determines that the management end button 401 has accepted the input (Yes at S913), the process proceeds to S914.

Next, in S914, the abnormality reporting application ends the management, and the display is switched from the tool managing screen (described above and in FIG. 4) to the tool management setting screen (described above and in FIG. 3). Also, the communication-terminal-side control unit 120 generates the locked-state switch request signal. Then, the locked-state switch request signal is broadcasted by the communication-terminal-side control unit 120 to all of the electric tools with which the connection via the wireless communication is established. Note that the locked-state switch request signal may be unicasted by the communication-terminal-side control unit 120 to each of the electric tools with which the connection via the wireless communication is established.

Next, in S915, the communication-terminal-side control unit 120 determines whether the management of the electric tools has ended. If the communication-terminal-side control unit 120 determines that the management of the electric tools has not ended in S915 (No at S915), the process proceeds to S902. Meanwhile, if the communication-terminal-side control unit 120 determines that the management of the electric tools has ended (Yes at S915), the overall processing ends. Note that the communication-terminal-side control unit 120 determines that the management of the electric tools has ended when receiving the input to terminate the abnormality reporting application, or when the power source of the communication terminal 100 is turned off.

Also, instead of reporting by the report unit 170 in S909 and reporting by the report unit 70 in S912, the reporting may be executed by at least one of the report unit 170 and the report unit 70.

Effect of Embodiment

According to the abnormality reporting system of the embodiment described above, when the communication-terminal-side control unit 120 determines that abnormality has occurred in any of the electric tools, the occurrence of abnormality in the electric tool may be reported by at least one of the report unit 70 of the electric tool other than the electric tool in which the occurrence of abnormality is determined and the report unit 170 of the communication terminal 100, so that the occurrence of abnormality in the electric tool can be immediately reported to the operator.

Also, the communication-terminal-side communication unit 160 transmits the report request signal to all of the electric tools other than the electric tool in which the occurrence of abnormality is determined, such that the occurrence of abnormality in the electric tool can be reported to many operators.

Also, the communication-terminal-side control unit 120 determines that abnormality has occurred in the electric tool when the wireless communication is disconnected, such that the event that the electric tool is brought out of the range in which the electric tools can establish the communication with the communication terminal 100 can be reported to the operator.

Also, the communication-terminal-side control unit 120 determines that abnormality has occurred in the electric tool when the electric tools exceeding the number of electric tools scheduled to operate are in operation, such that it is possible to report to the operator that an outsider has entered the work site and operated the electric tool.

Also, the communication-terminal-side control unit 120 determines that abnormality has occurred in the electric tool when the electric power supplied to the electric tool is cut off, such that the occurrence of abnormality in the electric tool can be reported more immediately to the operator.

Also, the communication-terminal-side control unit 120 determines that abnormality has occurred in the electric tool when the trigger of the electric tool is pulled successively within the predetermined time period or simultaneously, such that the event that the abnormal operation that is not executed by the operator has been executed can be reported to the operator.

Also, the controller 62 stops the electric tool when receiving the report request signal and switches to the locked state in which the operation of the electric tool is locked, such that the operation of the electric tool in which abnormality has occurred can be prevented.

Also, the controller 62 releases the locked state while the electric tool is connected to the communication terminal 100 via the wireless communication, and switches to the locked state when the wireless communication is disconnected, such that the security of the electric tools can be increased.

Also, the controller 62 releases the locked state when the electric tool is connected with the communication terminal 100 via the wireless communication and then, the trigger of the electric tool is pulled, such that the operation of the electric tool that has actually been operated can be started.

In the foregoing, the invention made by the inventors of the present invention has been concretely described based on the embodiments. However, it is needless to say that the present invention is not limited to the foregoing embodiments and various modifications and alterations can be made within the scope of the present invention.

EXPLANATION OF REFERENCE CHARACTERS

1 ... electric tool, 10 ... air compressor, 11 ... base, 12a, 12b ... air tank, 13 ... leg, 14a, 14b ... handle, 15 ... drive box, 16 ... motor, 17 ... motor rotational shaft, 18 ... rotor, 19 ... stator, 21a, 21b ... cylinder, 22a, 22b ... piston, 23a, 23b ... connecting rod, 24a, 24b ... eccentric cam, 25a, 25b ... drive chamber, 26a, 26b ... cylinder head, 27a, 27b ... check valve, 28a, 28b ... discharge chamber, 29a, 29b ... pipe, 30 ... compressed air generation unit, 31a, 31b ... cooling fan, 32 ... body side control unit, 33 ... cover, 34a, 34b ... coupler, 35a, 35b ... pressure reducing valve, 37 ... display unit, 39 ... body side communication unit, 39a ... transmission/reception unit, 41 ... permanent magnet, 42 ... base unit, 43 ... arm, 44 ... winding, 51 ... inverter circuit, 52 ... commercial power source, 54 ... rectifier circuit, 55 ... power factor correction circuit (PFC), 56 ... IC, 57 ... voltage detection circuit, 61 ... motor control unit, 62 ... controller, 63 ... control signal output circuit, 64 ... operation switch, 65 ... operation switch detection circuit, 66 ... rotor position detection circuit, 67 ... motor rotational number detection circuit, 68 ... motor current detection circuit, 69 ... connection cable, 70 ... report unit, 100 ... communication terminal, 110 ... power source unit, 120 ... communication-terminal-side control unit, 130 ... image processing unit, 140 ... display unit, 150 ... input unit, 160 ... communication-terminal-side communication unit, 170 ... report unit.

The invention claimed is:

1. A system comprising:
devices each configured to perform a function; and
a communication terminal connected to the devices via wireless communication, wherein
the communication terminal includes a communication-terminal-side control unit that:
registers the devices, and
establishes the wireless communication with the devices registered,
determines whether an abnormality has occurred in any of the devices based on information from the devices via the wireless communication, and
controls a report unit to notify a user of the communication terminal that any of the registered devices has an abnormality,
the devices each include a controller which determines that the wireless communication with the communication terminal is in a disconnected state and disables the function when:
the device are out of an range of the wireless communication with the communication terminal, and
the wireless communication is disconnected by the user of the communication terminal.

2. The system according to claim 1,
wherein the communication-terminal-side control unit generates a report request signal when determining that abnormality has occurred in any of the devices,
the communication terminal includes a communication-terminal-side communication unit that transmits the report request signal generated by the communication-terminal-side control unit to the devices other than the device in which the occurrence of abnormality is determined, and
a report unit of the device reports the occurrence of abnormality in the device when receiving the report request signal.

3. The system according to claim 2, wherein the communication-terminal-side communication unit transmits the report request signal to all of the devices other than the device in which the occurrence of abnormality is determined.

4. The system according to claim 2,
wherein the device includes a body side control unit that stops the device and switches to a locked state in which the operation of the device is locked when receiving the report request signal.

5. The system according to claim 1,
wherein the communication-terminal-side control unit determines that abnormality has occurred in the device when the wireless communication is disconnected.

6. The system according to claim 1,
wherein the communication terminal includes an input unit that accepts an input of a number representing the number of the devices scheduled to operate, and
the communication-terminal-side control unit determines that the abnormality has occurred in the device when the devices exceeding the number of the devices scheduled to operate are in operation.

7. The system according to claim 1,
wherein the communication-terminal-side control unit determines that abnormality has occurred in the device when an electric power supplied to the device is cut off.

8. The system according to claim 1,
wherein the communication-terminal-side control unit determines that abnormality has occurred in the device when a trigger of the device is pulled number of times larger than a predetermined number of times successively within a predetermined period of time or simultaneously.

9. The system according to claim 1,
wherein the communication-terminal-side control unit determines that abnormality has occurred in the device when a motor of the device has continuously operated for a predetermined time period or more.

10. The system according to claim 1,
wherein the device includes a body side control unit that releases a locked state of the device while the device is connected to the communication terminal via the wireless communication, stops the device, and switches to the locked state in which the operation of the device is locked when the wireless communication is disconnected.

11. The system according to claim 1,
wherein the device includes a body side control unit that releases a locked state of the device when the device is connected to the communication terminal via the wireless communication and then, a trigger of the device is pulled.

12. The system according to claim 2, wherein the report unit of the device is an LED lamp, and blinking the LED lamp reports the occurrence of abnormality in the device.

13. The system according to claim 1, wherein the device is an air compressor.

14. The system according to claim 1, wherein the device is a cordless device.

15. The system according to claim 1, wherein the device is operated by an electric power supplied from an AC power source.

16. A device performing a function, comprising:
a controller connected to a communication terminal unit via wireless communication to transmit/receive a control signal to and from the communication terminal, the wireless communication being performed among the device, the communication terminal, and other devices; and
a report unit reporting information to a user of the device, wherein
the controller receives a report signal from the communication terminal indicating that there is an abnormality in any of the other devices, and
when the controller receives the report signal, the controller controls the report unit to show that any of the other device has the abnormality, and
the controller determines that the wireless communication with the communication terminal is in a disconnected state and disables the function when:
the device is out of an range of the wireless communication with the communication terminal, and
the controller determines that the wireless communication is disconnected by a user of the communication terminal.

17. A communication terminal connected to devices via wireless communication, the communication terminal comprising:
a report unit reporting information to a user of the communication terminal; and
a communication-terminal-side control unit that:
registers the devices each performing a function;
establishes the wireless communication with the devices registered,
determines whether there is an abnormality in any of the devices based on information from the devices via the wireless communication, and
controls a report unit to notify the user of the communication terminal that any of the registered devices has an abnormality, wherein
when the communication-terminal-side control unit determines that any of the devices has the abnormality, the communication-terminal-side control unit generates a report request signal to at least one of the report unit in the communication terminal and report units in the devices having no abnormality, in order to report that any of the devices has the abnormality, and
the devices each include a controller determines that the wireless communication with the communication terminal is in a disconnected state and disables the function
when:
the devices are out of an range of the wireless communication with the communication terminal, and
the wireless communication is disconnected by the user of the communication terminal.

18. An abnormality system comprising:
devices each performing a function; and
a communication terminal connected to the devices via wireless communication, wherein
the communication terminal includes a communication-terminal-side control unit that:
registers the devices,
establishes the wireless communication with the devices registered, and
determines whether any of the devices has abnormality based on information from the devices via the wireless communication,
controls a report unit to notify a user of the communication terminal that any of the registered devices has an abnormality,
when the communication-terminal-side control unit determines that any of the devices has the abnormality, the communication-terminal-side control unit sends a report request signal to at least one of the report unit in the communication terminal and report units in the devices having no abnormality, in order to report that any of the devices has the abnormality,
the devices each include a controller which determines that the wireless communication with the communication terminal is in a disconnected state and disables the function when
the devices are out of an range of the wireless communication with the communication terminal, and
the wireless communication is disconnected by the user of the communication terminal.

* * * * *